United States Patent [19]

Shalvi

[11] Patent Number: 5,521,652
[45] Date of Patent: May 28, 1996

[54] PROXIMITY CONTROLLED SAFETY DEVICE FOR A VIDEO MONITOR

[76] Inventor: Ilan Shalvi, 245 Carlton Ter., Teaneck, N.J. 07666

[21] Appl. No.: 234,309

[22] Filed: Apr. 28, 1994

[51] Int. Cl.⁶ ..................................... H04N 5/65
[52] U.S. Cl. .......................... 348/819; 348/818; 348/162
[58] Field of Search ..................... 348/818, 819, 348/820, 143, 162, 163, 164, 553, 734; 340/901

[56] References Cited

U.S. PATENT DOCUMENTS

| | | | |
|---|---|---|---|
| 4,240,152 | 12/1980 | Duncan et al. ......................... | 340/901 |
| 4,417,278 | 11/1983 | Hensleigh et al. .................... | 348/818 |
| 4,716,469 | 12/1987 | Kim et al. ............................. | 348/818 |
| 4,831,448 | 5/1989 | Park ...................................... | 348/818 |
| 4,835,614 | 5/1989 | Ryu ....................................... | 348/818 |

*Primary Examiner*—Scott A. Rogers
*Assistant Examiner*—Thomas D. Lee
*Attorney, Agent, or Firm*—Plevy & Associates

[57] ABSTRACT

A proximity controlled safety device for a video monitor that prevents accidental over exposure to electromagnetic radiation and optical brightness. A proximity sensor detects the presence of a person near the video monitor. A control device determines how close the person is to the video monitor and either disrupts the video signal being received by the video monitor or disrupts the power running the video monitor depending upon how close the person is standing to the video monitor.

20 Claims, 2 Drawing Sheets

PROXIMITY CONTROLLED SAFETY DEVICE FOR A VIDEO MONITOR

FIELD OF THE INVENTION

The present invention relates in general to safety devices for use with video monitors, that automatically deactivate the video monitor if a person is standing too close to the video monitor for a predetermined time. More specifically, the present invention relates to a two step safety device that disrupts the video signal to a video monitor, if a person is within a first proximity, and disconnects the power to the video monitor if a person is within a second, closer proximity.

BACKGROUND OF THE INVENTION

Most all cathode ray tubes (CRTs), such as those used in television sets, computer monitors and the like emit electromagnetic radiation. The measured intensity of the electromagnetic radiation is directly proportional to the proximity of the measurement to the CRT. In other words, the closer a person is to the CRT, the more intense the electromagnetic radiation becomes. Unfortunately, electromagnetic radiation is suspected of being a health hazard. Exposure to electromagnetic radiation has been implicated as being the cause, or partial cause, of several types of cancer and neurological disorders. Similarly, over exposure to electromagnetic radiation is suspected to increase birth defects and increase the chances for a miscarriage.

Another harmful effect, also associated with CRTs, is caused by the optical brightness of the image being produced by the CRT. This danger affects the eyes of the viewer and is also proportional to the distance between the viewer and the CRT. As a result, the brightness of the image is more intense the closer to the CRT a person stands. Watching an over bright CRT at a location too close to the CRT can cause physical damage to the eye that permanently effects a person's vision.

With the growing popularity of television, personal computers, video games and the like, people are spending more and more time sitting and standing in front of CRTs. As a result, people are experiencing larger doses of electromagnetic radiation. The problem is even more prevalent with young children. Young children tend to watch more television and play more computer video games than typical demographic groups. Additionally, children typically do not recognize the dangers presented by video monitors and tend to stand or sit directly in front of the video monitor when watching television or playing a game. As a result, there exists a need for a device that will prevent a child or another person from overexposing themselves to the electromagnetic radiation and other harmful effects of a CRT.

In the prior art there are many devices that are either activated or deactivated by the close proximity of a person to that device. Such devices are commonly used to automatically open and close doors or to turn on and off lights. Similarly, such devices exist in the field of security, such as motion detectors for activating alarms. Most proximity detectors detect the presence of a person either by sensing a physical characteristic, such as the thermal heat or vibrations produced by the person, or by measuring a disruption in a transmitted signal. Examples of the latter include ultrasonic detectors, photodetectors, and Hall effect detectors that measure changes in a projected electromagnetic field. Specific examples of proximity detectors, used in the prior art to turn on and off equipment, include U.S. Pat. No. 5,047,752 to Schorn, entitled SAFETY SYSTEM FOR A MACHINE TOOL. In the Schorn patent a machine tool of any given design is equipped with an array of ultrasonic transmitters and receivers, which act as proximity sensors. If a person wanders too close to the machine tool while it is running, the person's presence is detected and the machine tool is automatically disabled. The Schorn patent also includes a range adjuster for adjusting the effective range of the ultrasonic transmitters and a timing circuit to delay the deactivation of the machine tool for a predetermined period of time.

Although the prior art record shows various devices that are automatically activated or deactivated by the proximity of a person, such prior art devices are not readily adaptable for use with a video monitor in a domestic environment. Video monitors in the home, (i.e. television sets and computer monitors) are typically positioned in areas of a home experience traffic. As a result, if a simple on/off proximity circuit were coupled to the video monitor, it would constantly be turned on and off. This is highly disruptive to any person watching the video monitor. Furthermore, the constant cycling on and off of the monitor can cause damage. Even prior art proximity systems that have time delays are not well suited for application with a video monitor in a domestic setting. In the environment of a person's home, it is very common for a person to pause in one area to talk to another person or to do any other every day activity. As such, a video monitor with a simple time delay would also constantly cycle on and off, again disrupting the person watching the monitor and causing harm to the monitor itself.

It is therefore and objective of the present invention to provide a proximity controlled safety device for a video monitor that prevents a person from overexposure to electromagnetic radiation and optical brightness yet is not harmful to the video monitor and is not disruptive in a domestic environment.

It is another object of the present invention to provide such a proximity controlled safety device that can be retroactively added to most any existing video monitor or can be integrally formed as part of any new video monitor.

SUMMARY

The present invention is a proximity controlled safety device that selectively controls a piece of equipment, such as a television set, in response to the proximity of a person to that piece of equipment. The present invention includes a proximity sensor capable of detecting a person within a predetermined range. The proximity sensor is coupled to a control means that controls the operation of the piece of equipment in use. The control means performs two operations depending upon the position of a person relative to the piece of equipment in use. If the proximity sensor detects a person near the piece of equipment but not necessarily dangerously close to the piece of equipment, the control means may disrupt one or more of the functions of the piece of equipment. For example, in use with a television set, if a person is detected near the television set, the control means may disrupt the video signal received by the television set causing the television monitor to go blank. Such a disruption in normal operation may serve as a warning to the person that he or she is standing too close to the television set.

Alternatively, if the proximity sensor detects a person dangerously close to the piece of equipment in use, the control means disrupts the equipment power supply, thereby disabling the device. For example, in use with a television set, if a person is detected in close proximity to the picture tube, the control means will turn off the television set, thereby protecting the person from overexposure to electromagnetic radiation and optical brightness.

The present invention may also include various delay devices that prevent the disruption of the piece of equipment unless a person is within the detected range for an predetermined period of time. This allows the piece of equipment to operate normally in the presence of everyday pedestrian traffic. Furthermore, the present invention may include various adjustments that allow for the selective alteration of the range scanned by the proximity sensor, the operation of the control means and the duration a person can stand within the detection range without effecting a change.

BRIEF DESCRIPTION OF THE DRAWINGS

For a better understanding of the present invention, reference is made to the following description of an exemplary embodiment thereof; considered in conjunction with the accompanying drawings, in which.

DETAILED DESCRIPTION OF THE INVENTION

As indicated, the present invention is especially suitable for use in connection with a video monitor, such as a television, located in a domestic environment. Accordingly, the present invention will be described in connection with a conventional television display monitor application.

Figure 1:
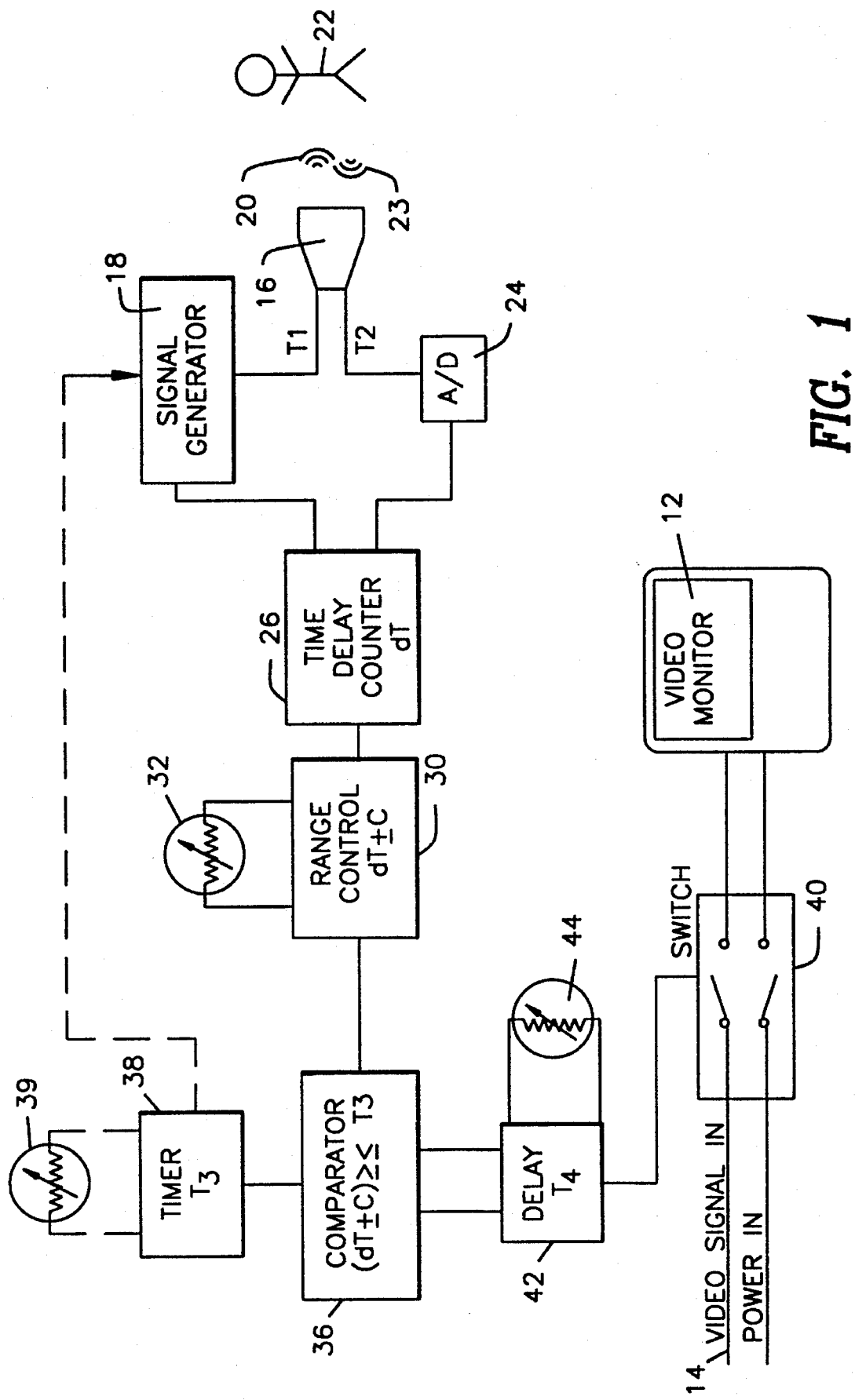
FIG. 1 is a block diagram schematic view showing the various components to one preferred embodiment of the present invention proximity controlled safety device used in conjunction with a television monitor display.

Referring to FIG. 1, there is shown one preferred embodiment of the present invention in conjunction with a television display monitor 12. As is well known, a television display monitor 12 converts incoming video signals 14 into a visible display. The video signals 14 may be broadcast and received by an antenna, an input cable signal, a signal produced by a video recording device, or a signal produced by a video game device coupled to the television display monitor 12. The television display monitor 12 itself is powered by standard domestic A\C service. As will be explained, the present invention is a proximity controlled safety device that can be made part of any television display monitor or can be retroactively attached to any existing television display monitor. The present invention device detects how close a person is to the television display monitor 12. If a person is too close to the display monitor 12, the present invention device, disrupts the incoming video signal 14, thereby preventing the above described hazards. If a person comes particularly close to the television display monitor 12, the present invention device will disrupt the power feeding the television display monitor 12. As a result, the television display monitor 12 is disabled and the person standing close to the monitor is not exposed to excessive levels of electromagnetic radiation.

In FIG. 1, it can be seen that the present invention proximity controlled safety device includes a sensor array 16. In the shown embodiment, the sensor array 16 includes an ultrasonic transmitter/received capable of transmitting ultrasonic signals produced by the signal generator 18 and receiving back those same signals after they have been reflected off of an object. As such, the sensor array 16 acts as a proximity sensor capable of detecting the presence of any object within a predetermined range. It will be understood that the use of an ultrasonic sensor array 16 and signal generator 18 are merely exemplary and any other functionally equivalent components can be used, such as an infrared (IR) transmitter/receiver, or a laser light transmitter/receiver.

In the shown embodiment, the sensor array 16 transmits an ultrasonic signal 20 at an initial time period T1, the ultrasonic signal propagates forward from the sensor array 16 until it meets a target object 22 such as a person. The ultrasonic signal 20 then reflects off of the target object 22 and where it is again detected by the sensor array 16 at a delayed time T2. The reflected ultrasonic signal 23 is then converted to a digital signal by an analog-to-digital converter 24. The signal generator 18 and the analog-to-digital converter are both coupled to a time delay counter 26. The time delay counter 26 counts the time difference dT between the creation of the ultrasonic signal 20 at T1 and the return of the reflected ultrasonic signal 23 at T2. Since the ultrasonic signal 20 is reflecting off of an object, the time difference dT between the transmission and receipt of the ultrasonic signal is indicative of the distance of the target object 22 from the sensor array 16.

A range control circuit 30 is coupled to the time delay counter 26. The range control circuit 30 is capable of either adding or subtracting a time value constant C to the time difference dT measured by the time delay counter 26. As a result, the range control circuit 30 produces a value equivalent to the time difference dT+/− the constant C, expressed as (dT+/−C). The value of the time value constant C added by the range control circuit 30 can be preset or adjustable. In the shown embodiment, the time value constant C is determined by a potentiometer 32 coupled to range control circuit 30. However, other variable controls such as values read from a stored memory, dual-in-line-package (D.I.P.) switches or any other known variable input can also be used.

A comparator 36 is coupled to both the range control circuit 30 and a timer 38. The timer 38 counts a predetermined period of time T3 starting from the initial generation of the ultrasonic signal at T1. The length of the predetermined period of time T3 may be either fixed or variable. If variable, a variable control, such as the shown potentiometer 39, may be coupled to the timer 38 to enable the selective control of the predetermined period of time T3. As will be later explained, the use of a variable control on the timer 38 is optional and the range control circuit 30 can be eliminated if a timer 38 with such a variable control is used.

The timer 38 may optionally be coupled to the signal generator 18. As such, the signal generator 18 can be used to trigger the timer 38, wherein the timer 38 is reset and starts to count, each time the signal generator 18 generates an ultrasonic signal. Alternatively, the timer 38 and the signal generator 18 need not be coupled if both are synchronized. For instance, if both the signal generator 18 and the timer 38 have the same frequency of operation, the timer 38 would know when the signal generator 18 is generating the ultrasonic signal and there would be no requirement of an electrical interconnection.

In a preferred embodiment the comparator 36 compares the value (dT+/−C) created by the range control circuit 30 to the predetermined period of time T3 measured by the timer 38. If the value (dT+/−C) is less than the predetermined time T3, one of two switching signals S1, S2 is sent to a switching circuit 40 that controls the interconnection of the video signals 12 and electric power to the television display monitor 12. Prior to the switching signals S1, S2, the switching signals S1, S2 pass through a delay circuit 42. The delay circuit 42 delays the switching signals S1, S2 from being received by the switching circuit 40 by time period T4. The time period T4 can be either a fixed value or a variable value. If variable, the delay circuit 42 can include a variable control device, such as the shown potentiometer 44, or any other known means for varying the delay time period T4.

Figure 2:
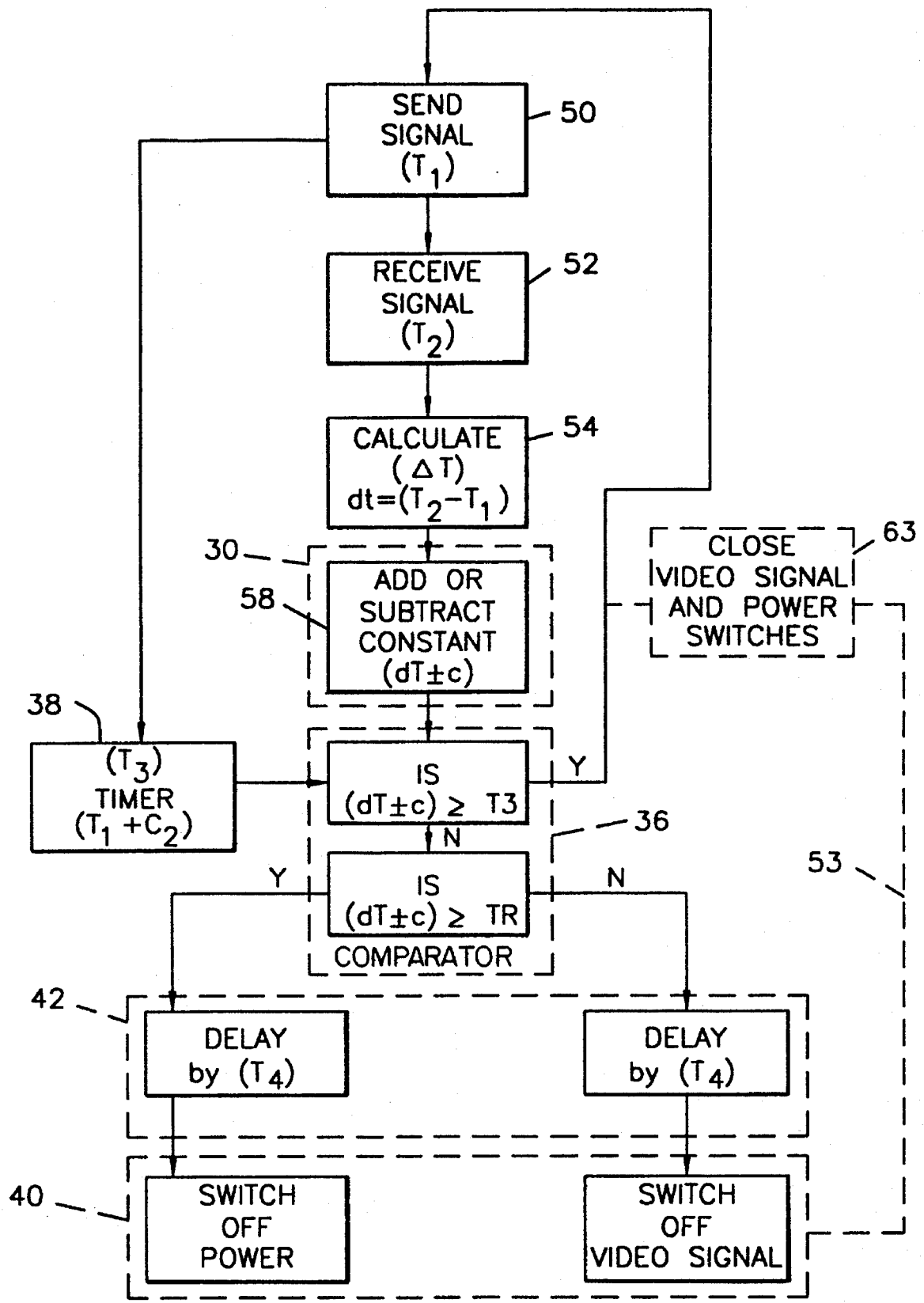
FIG. 2 is a flow chart diagram showing the operational logic for the preferred embodiment of the present invention shown in FIG. 1.

Referring to FIG. 2, in conjunction with FIG. 1, the operation of the present invention proximity controlled safety device can best be described. As can be ascertained from block 50 in FIG. 2, the operation begins by the sending of an ultrasonic, infrared, or light signal at time period T1. As previously described, the signal sent is produced by a signal generator 18 (see FIG. 1). The signal is transmitted by a sensor array 16, wherein the signal is reflected off a target object 22 and returns to the sensor array 16 (see FIG. 1). As shown by block 52, the reflected signal is received at time period T2. The time delay counter 26 (see FIG. 1) performs the step indicated in block 54 and calculates the time difference dT between the transmittance of the signal at time period T1 and the receipt of the reflected signal at time period T2. The time difference dT is indicative of the distance of a target object from the point of signal transmission.

In the preferred embodiment, the step shown in block 58 of adding or subtracting a constant C to the time difference dT is performed by a variable range control circuit 30, thus producing a value of (dT+/–C). Adding or subtracting a constant C from the time difference value dT, changes the value of time difference dT. Since time difference dT is indicative if the distance of a target object from the point of signal transmission, by adding or subtracting a constant C to the time difference dT, the value (dT+/–C) would alter the perceived distance of the target object by making the target object either appear closer or farther away than it is. Consequently, the range control circuit 30 can make the target object seem either closer or further than it is, thus controlling the overall sensitivity of the present invention device to a target object at a given distance.

The comparator 36 compares the value (dT+/–C) produced by the range control circuit 30 to a time value T3 produced by a timer 38. The time value T3 produced by the timer 38 is a predetermined period that begins when the original signal is generated at T1. In other words, time value T3 is equal to time value T1 plus a known constant C2, expressed as (T1+C2). The purpose of the present invention device is to detect when a person has come within a predetermined danger range of a video monitor. The time value T3 is selected to represent the minimum time is should take the transmitted signal to be emitted from the present invention, reflect off a person standing just outside the danger range and return back to the present invention. For example, suppose it is determined that the danger range around a given television set is three (3) feet. The value selected for time value T3 would be the time it takes an ultrasonic, infrared or light signal to be emitted, travel through the three foot danger region, reflect off an object and return. In other words, the value of time value T3 is indicative of how long is should take the transmitted signal to be omitted, reflected and return from an object positioned just at the edge of a predetermined zone of danger. In a preferred embodiment, the value of time value T3 is fixed and adjustments in the effective range of the present invention device are performed by varying the range control circuit 30. However, as can be ascertained, if a timer 38 is used that can create a variable time value T3, then the effective range of the present invention can be varied as desired by selectively controlling the value of time value T3. As a result, if a variable time 38 is used, the range control circuit 30 need not be present. In the preferred embodiment, the comparator 36 compares the time value T3 to the time difference value (dT+/–C), created by the range control circuit 30. In an embodiment with a variable timer and no range control circuit, the comparator 36 would compare the variable time value of the timer (T3+/–C) to the time difference dT. Thus, the difference between the two embodiments is merely which side of the comparison equation contains the variable constant. As a result, the two embodiments are functional equivalents and perform the same operation.

Assuming the preferred embodiment (a fixed timer 38 and a variable range control circuit 30), the comparator 36 compares the time value T3 obtained from the timer 38 to the value (dT+/–C) obtained from the range control circuit 30. Since the value (dT+/–C) is indicative of how far the target object is from the present invention and the time value T3 is indicative of the minimum safe distance from the present invention, if (dT+/–C) is greater than or equal to time value T3, [(dT+/–C)≧T3] then it is understood that the target object is not within the danger zone and the operation of the television display monitor is left undisturbed. However, if the value (dT+/–C) is less than the time value T3, then it is understood that the target object is within the predetermined danger zone of the television display monitor 12.

The comparator 36 performs a two-step comparison. In the first step, the comparator 36 determines whether of not the value (dT+/–C) is less than time value T3. If it is, the comparator 36 then performs a second step and determines whether the target object is in a first area of potential danger or a second area of impending danger, the latter being closer to the television display monitor 12 than the former. For example, a television display monitor may have a danger zone associated with it of three (3) feet. Within that three foot danger zone, the outermost two feet may be dangerous only for long term exposures. The innermost foot, however, may be dangerous even for short term exposures. This area of impending danger, as opposed to potential danger, is a value that can be determined for any given television display monitor. For the purposes of this description, the value corresponding to the area of potential danger is given threshold value TR. The comparator 36 compares the value (dT+/–C), obtained from the range control circuit 30, to the threshold value TR. If the value (dT+/–C) is greater than threshold value TR, and is less than time value T3, then a first switching signal S1 is forwarded to the delay circuit 42 that indicates that the target object is within the area of potential danger with regard to the television display monitor. If the value (dT+/–C) is less than threshold value TR, then a second switching signal S2 is forwarded to the delay circuit 42 that indicates that the target object is within the area of potential danger with regard to the television display monitor.

The delay circuit 42 delays either the first switching signal S1 or the second switching signal S2 by a period of delay T4. As has been described in regards to FIG. 1, the period of delay T4 can be selectively varied as desired utilizing a potentiometer 44 or another variable input device. The delay circuit 42, after the period of delay T4, forwards either the first switching signal S1 or the second switching signal S2 to the switching circuit 40, provided the status of either signal has not changed during the period of delay T4. If the switching circuit 40 receives the first switching signal S1 for longer than the period of delay T4, the switching circuit 40 disrupts the video signal being received by the television display monitor. As a result, the television display monitor will go blank, indicating to a person that they are standing too close to the monitor. If the switching circuit 40 receives the second switching signal S2 for longer than the period of delay T4, than the switching circuit 40 will disrupt the power to the television display monitor. This deactivates the television display monitor preventing excess exposure to electromagnetic radiation and optical brightness.

In a practical embodiment, the present invention proximity controlled safety device can a device place on or near a television set or can be integrally formed as part of the television set. As such, if a child stands too close to the television, the screen will go black. If the child is standing very close to the television the television will turn off, thereby protecting the child from harm.

Returning to FIG. 2, it will be seen that the proximity scanning performed by the present invention is recursive in nature. As has been stated, the comparator 36 compares the value (dT+/−C) obtained from the range control circuit 30 to the time value T3 obtained from the timer 38. If the value (dT+/−C) is greater than time value T3, the television display monitor continues to operate normally. Signals are repeatedly sent and received to ensure that a person entering the range of the present invention device will be immediately detected. If a person is detected near the television monitor device but leaves before the passage of time delay period T4, the switching signals (S1 or S2) are not forwarded to the switching circuit 40, and the television display monitor operates normally. As a result, a person could temporarily approach the television display monitor, to be disrupted the channel or the like, without causing the normal operation of the television display monitor to be disrupted.

In the situation where a person has approached the television display monitor for a long enough period of time to cause the television display monitor to go blank or to turn off, the present invention may optionally revert the television display monitor back to normal operation once the person has stepped away from the television display monitor. For instance, as is indicated by block 63, if the comparator 36 finds that the value (dT+/−C) has changed and has become greater than time value T3, a switching signal S3 will be forwarded to the switching circuit 40 that enables either the video signal or the power to again be coupled to the television display monitor. Consequently, of a person paused in front of the television display monitor, it would either temporarily go blank or turn off and once the person walked away, the television display monitor would resume normal operation.

It will be understood that the present invention proximity controlled safety device described herein is merely exemplary and that a person skilled in the art may make many variations and modifications to the described embodiment utilizing functionally equivalent components and circuits to those described. All such variations and modifications are intended to be included within the scope of the invention as defined by the appended claims.

What is claimed is:

1. A proximity control apparatus for selectively controlling a video monitor, wherein the video monitor displays at a predetermined optical brightness an incoming video signal and is activated by a source of electricity that causes the video monitor to emit electromagnetic radiation, said apparatus comprising:

sensing means for sensing the presence of a person within a predetermined range of said video monitor, said predetermined range including an inner region immediately proximate said video monitor and an outer region extending beyond said inner region; and control means, coupled to said sensing means, for controlling the incoming video signal and the incoming source of electricity, wherein said control means disrupts said video signal, and causes the video monitor to go blank, without deactivating the video monitor, when said sensing means senses a person within said outer region of said predetermined range and wherein said control means disrupts said source of electricity, and deactivates the video monitor when said sensing means senses a person within said inner region of said predetermined range, whereby said control means protects a person in said outer region from the optical brightness and protects a person in said inner region from the optical brightness and electromagnetic radiation.

2. The apparatus according to claim 1, further including a variable means for selectively varying said predetermined range with respect to the video monitor.

3. The apparatus according to claim 1, further including a means for selectively varying said inner region and said outer region with respect to said predetermined range.

4. The apparatus according to claim 1, further including a delay means coupled to said control means, said delay means preventing said control means from effecting said video monitor until said sensing means senses a person in said predetermined range for a predetermined period of time.

5. The apparatus according to claim 4, further including a variable means, coupled to said delay means, for selectively varying said predetermined period of time.

6. The apparatus according to claim 1, wherein said sensing means includes a signal generator for generating an emission signal and a transmitter/receiver for transmitting said emission signal and receiving a return signal reflected off of a person present within said predetermined range.

7. The apparatus according to claim 6, further including a counter for counting a time difference value between said emission signal and said return signal, wherein said time difference value is indicative of the distance of said person from said sensor array.

8. The apparatus according to claim 7, further including a timer means for providing a predetermined time value indicative of the time it takes said emission signal to traverse said predetermined range and said return signal to return.

9. The apparatus according to claim 8, further including a comparator means for comparing said time difference value to said predetermined time value, whereby said comparator means determines whether said person is within said predetermined range.

10. The apparatus according to claim 7, further including a variable means, coupled to said counter means, for selectively varying said time difference value.

11. The apparatus according to claim 8, further including a variable means, coupled to said timer means, for selectively varying said predetermined time value.

12. A method of protecting a person from excessive exposure to electromagnetic radiation being emitted by a television monitor and protecting a person from the optical brightness of said television monitor, comprising the steps of:

detecting the presence of a person within a predetermined range of said television monitor, wherein said predetermined range is indicative of the area around said television monitor where excessive electromagnetic radiation exists, said predetermined range including a first region proximate said television monitor and a second region separated from the television monitor by said first region;

disrupting an image displayed by the television monitor causing the television monitor to go blank when a person is detected in said second region, thereby protecting the person from the optical brightness; and deactivating the television monitor when a person is detected in said first region of said predetermined range, thereby preventing the person from being overexposed to the electromagnetic radiation and protecting the person from the optical brightness.

13. The method according to claim 12, further including the step of delaying the disruption of the television monitor imager for a period of time when a person is detected in said second region of said predetermined range.

14. A method of selectively controlling the operation of a television in response to the presence of a person proximate said television, comprising the steps of:

detecting the presence of said person within a predetermined area proximate said television;

determining whether said person is within a first region, a given distance from said television or a second region closer to said television than said first region;

disrupting at least one function of said television when said person is detected in said first region, protecting said person from at least one hazard associated with the operation of said television without disrupting every function of said television; and disabling every function of said television when said person is detected in said second region.

15. The method according to claim 14 further including the step of selectively setting said predetermined area in which a person is detected.

16. The method according to claim 14, further including the step of selectively adjusting the size of said first region and said second region is said predetermined area.

17. The method according to claim 14, further including the step of delaying the step of disrupting at least one function for a predetermined period of time.

18. The method according to claim 14, further including the step of delaying the step of disabling every function for a predetermined period of time.

19. The method according to claim 14, further including the step of reactivating every function of said television when said person leaves said predetermined area.

20. The method according to claim 14, wherein said television includes a video monitor that receives a video signal and said step of disrupting at least one function includes disrupting said video signal.

\* \* \* \* \*